US010618026B2

(12) United States Patent
Taylor et al.

(10) Patent No.: US 10,618,026 B2
(45) Date of Patent: Apr. 14, 2020

(54) REGENERATIVE COOLING METHOD AND APPARATUS

(71) Applicant: MONOLITH MATERIALS, INC., Redwood City, CA (US)

(72) Inventors: Roscoe W. Taylor, San Mateo, CA (US); Alexander Hoermann, Menlo Park, CA (US)

(73) Assignee: MONOLITH MATERIALS, INC., Redwood, CA (US)

( * ) Notice: Subject to any disclaimer, the term of this patent is extended or adjusted under 35 U.S.C. 154(b) by 85 days.

(21) Appl. No.: 15/548,348

(22) PCT Filed: Feb. 1, 2016

(86) PCT No.: PCT/US2016/015942
§ 371 (c)(1),
(2) Date: Aug. 2, 2017

(87) PCT Pub. No.: WO2016/126600
PCT Pub. Date: Aug. 11, 2016

(65) Prior Publication Data

US 2018/0015438 A1 Jan. 18, 2018

Related U.S. Application Data

(60) Provisional application No. 62/111,341, filed on Feb. 3, 2015.

(51) Int. Cl.
*B01J 19/08* (2006.01)
*C09C 1/48* (2006.01)
(Continued)

(52) U.S. Cl.
CPC ......... *B01J 19/087* (2013.01); *B01J 19/0013* (2013.01); *C09C 1/485* (2013.01);
(Continued)

(58) Field of Classification Search
CPC ................. B01J 19/087; B01J 19/0013; B01J 2219/0803; B01J 2219/0871;
(Continued)

(56) References Cited

U.S. PATENT DOCUMENTS

| | | | |
|---|---|---|---|
| 1,339,225 | A | 5/1920 | Rose |
| 1,536,612 | A | 5/1925 | Lewis |

(Continued)

FOREIGN PATENT DOCUMENTS

| | | | |
|---|---|---|---|
| AU | 28970/71 | A | 11/1972 |
| CA | 830378 | A | 12/1969 |

(Continued)

OTHER PUBLICATIONS

Bakken et al. "Thermal plasma process development in Norway." Pure and applied Chemistry 70.6 (1998): 1223-1228.

(Continued)

*Primary Examiner* — Xiuyu Tai
(74) *Attorney, Agent, or Firm* — Wilson Sonsini Goodrich & Rosati

(57) ABSTRACT

A method of cooling a liner in a plasma chamber. A recycle gas is contacted with or passed through the liner to cool the liner and pre-heat the recycle gas. The pre-heated gas is then recycled through the plasma chamber to become part of the plasma forming process. The method further comprises the liner is graphite, the recycle gas passes through at least one cooling channel present in the liner, at least one of the cooling channels are covered with at least one removable liner/channel cover, carbon deposits are formed from the presence of hydrocarbons in the recycle gas, at least one channel is formed in a spiral cooling channel pattern, at least one channel is formed in a substantially straight cooling channel pattern, and a plenum to aid in the production of an even distribution of cooling gas in the channels.

26 Claims, 3 Drawing Sheets

20
21
22
26
26
25
25
23
24

(51) Int. Cl.
*F27D 1/00* (2006.01)
*F27D 9/00* (2006.01)
*F27D 17/00* (2006.01)
*F27B 3/24* (2006.01)
*F28D 21/00* (2006.01)
*B01J 19/00* (2006.01)

(52) U.S. Cl.
CPC .............. *F27B 3/24* (2013.01); *F27D 1/0003* (2013.01); *F27D 9/00* (2013.01); *F27D 17/004* (2013.01); *F28D 21/00* (2013.01); *B01J 2219/0803* (2013.01); *B01J 2219/0871* (2013.01); *B01J 2219/0875* (2013.01); *B01J 2219/0898* (2013.01); *F27D 2009/0008* (2013.01); *F28D 2021/0022* (2013.01); *F28D 2021/0056* (2013.01); *F28D 2021/0078* (2013.01)

(58) Field of Classification Search
CPC ........ B01J 2219/0875; B01J 2219/0898; B01J 19/088; C09C 1/485; F27B 3/24; F27D 1/0003; F27D 9/00; F27D 17/004; F27D 2009/0008; F28D 21/00; F28D 2021/0022; F28D 2021/0056; F28D 2021/0078; B82Y 30/00; B82Y 40/00; C01B 32/152; C01B 32/15; C01P 2002/30
See application file for complete search history.

(56) References Cited

U.S. PATENT DOCUMENTS 1,597,277 A 8/1926 Jakowsky
2,062,358 A 9/1932 Frolich
2,002,003 A 5/1935 Eisenhut et al.
2,393,106 A 1/1946 Johnson et al.
2,557,143 A 6/1951 Royster
2,572,851 A 10/1951 Gardner et al.
2,603,669 A 7/1952 Chappell
2,616,842 A 11/1952 Sheer et al.
2,785,964 A 3/1957 Pollock
2,850,403 A 9/1958 Day
2,951,143 A 8/1960 Anderson et al.
3,009,783 A 11/1961 Sheer et al.
3,073,769 A 1/1963 Doukas
3,288,696 A 11/1966 Orbach
3,307,923 A 3/1967 Ruble
3,308,164 A 3/1967 Shepard
3,309,780 A 3/1967 Goins
3,331,664 A 7/1967 Jordan
3,344,051 A 9/1967 Latham, Jr.
3,408,164 A 10/1968 Johnson
3,409,403 A 11/1968 Bjornson et al.
3,420,632 A 1/1969 Ryan
3,431,074 A 3/1969 Jordan
3,464,793 A 9/1969 Jordan et al.
3,619,140 A 11/1971 Morgan et al.
3,637,974 A 1/1972 Tajbl et al.
3,673,375 A 6/1972 Camacho
3,725,103 A 4/1973 Jordan et al.
3,922,335 A 11/1975 Jordan et al.
3,981,654 A 9/1976 Rood et al.
3,981,659 A 9/1976 Myers
3,984,743 A 10/1976 Horie
4,028,072 A 6/1977 Braun et al.
4,035,336 A 7/1977 Jordan et al.
4,057,396 A 11/1977 Matovich
4,075,160 A 2/1978 Mills et al.
4,101,639 A 7/1978 Surovikin et al.
4,199,545 A 4/1980 Matovich
4,282,199 A 8/1981 Lamond et al.
4,289,949 A 9/1981 Raaness et al.
4,317,001 A 2/1982 Silver et al.
4,372,937 A 2/1983 Johnson
4,404,178 A 9/1983 Johnson et al.
4,452,771 A 6/1984 Hunt
4,472,172 A 9/1984 Sheer et al.
4,553,981 A 11/1985 Fuderer
4,601,887 A 7/1986 Dorn et al.
4,678,888 A 7/1987 Camacho et al.
4,689,199 A 8/1987 Eckert et al.
4,787,320 A 11/1988 Raaness et al.
4,864,096 A 9/1989 Wolf et al.
4,977,305 A 12/1990 Severance, Jr.
5,039,312 A 8/1991 Hollis, Jr. et al.
5,045,667 A 9/1991 Iceland et al.
5,046,145 A 9/1991 Drouet
5,105,123 A 4/1992 Ballou
5,147,998 A 9/1992 Tsantrizos et al.
5,206,880 A 4/1993 Olsson
5,352,289 A 10/1994 Weaver et al.
5,399,957 A 3/1995 Vierboom et al.
5,476,826 A 12/1995 Greenwald et al.
5,481,080 A 1/1996 Lynum et al.
5,486,674 A 1/1996 Lynum et al.
5,500,501 A 3/1996 Lynum et al.
5,527,518 A 6/1996 Lynum et al.
5,593,644 A 1/1997 Norman et al.
5,604,424 A 2/1997 Shuttleworth
5,611,947 A 3/1997 Vavruska
5,673,285 A 9/1997 Wittle et al.
5,717,293 A 2/1998 Sellers
5,725,616 A 3/1998 Lynum et al.
5,749,937 A 5/1998 Detering et al.
5,935,293 A 8/1999 Detering et al.
5,951,960 A 9/1999 Lynum et al.
5,989,512 A 11/1999 Lynum et al.
5,997,837 A 12/1999 Lynum et al.
6,068,827 A 5/2000 Lynum et al.
6,099,696 A 8/2000 Schwob et al.
6,188,187 B1 2/2001 Harlan
6,197,274 B1 3/2001 Mahmud et al.
6,358,375 B1 3/2002 Schwob
6,380,507 B1 4/2002 Childs
6,395,197 B1 5/2002 Detering et al.
6,403,697 B1 6/2002 Mitsunaga et al.
6,441,084 B1 8/2002 Lee et al.
6,442,950 B1 * 9/2002 Tung ........................ F28F 19/02 118/724
6,444,727 B1 9/2002 Yamada et al.
6,602,920 B2 8/2003 Hall et al.
6,703,580 B2 3/2004 Brunet et al.
6,773,689 B1 8/2004 Lynum et al.
6,955,707 B2 10/2005 Ezell et al.
7,167,240 B2 1/2007 Stagg
7,312,415 B2 12/2007 Ohmi et al.
7,431,909 B1 10/2008 Rumpf et al.
7,452,514 B2 11/2008 Fabry et al.
7,462,343 B2 12/2008 Lynum et al.
7,563,525 B2 7/2009 Ennis
7,655,209 B2 2/2010 Rumpf et al.
7,777,151 B2 8/2010 Kuo
8,147,765 B2 4/2012 Muradov et al.
8,221,689 B2 7/2012 Boutot et al.
8,257,452 B2 9/2012 Menzel
8,277,739 B2 10/2012 Monsen et al.
8,323,793 B2 12/2012 Hamby et al.
8,443,741 B2 5/2013 Chapman et al.
8,471,170 B2 6/2013 Li et al.
8,486,364 B2 7/2013 Vanier et al.
8,501,148 B2 8/2013 Belmont et al.
8,581,147 B2 11/2013 Kooken et al.
8,710,136 B2 4/2014 Yurovskaya et al.
8,771,386 B2 7/2014 Licht et al.
8,784,617 B2 7/2014 Novoselov et al.
8,850,826 B2 10/2014 Ennis
8,911,596 B2 12/2014 Vancina
9,095,835 B2 * 8/2015 Skoptsov ................. C10G 1/00
9,315,735 B2 4/2016 Cole et al.
9,445,488 B2 9/2016 Foret
9,574,086 B2 2/2017 Johnson et al.
10,138,378 B2 11/2018 Hoermman et al.

(56) References Cited

U.S. PATENT DOCUMENTS

2001/0029888 A1 10/2001 Sindarrajan et al.
2001/0039797 A1 11/2001 Cheng
2002/0000085 A1 1/2002 Hall et al.
2002/0050323 A1 5/2002 Moisan et al.
2002/0051903 A1 5/2002 Masuko et al.
2002/0157559 A1 10/2002 Brunet et al.
2003/0103858 A1 6/2003 Baran et al.
2003/0152184 A1 8/2003 Shehanee et al.
2004/0047779 A1 3/2004 Denison
2004/0071626 A1 4/2004 Smith et al.
2004/0081862 A1 4/2004 Herman
2004/0148860 A1 8/2004 Fletcher
2004/0168904 A1 9/2004 Anazawa et al.
2004/0211760 A1 10/2004 Delzenne et al.
2004/0216559 A1 11/2004 Kim et al.
2004/0247509 A1 12/2004 Newby
2005/0063892 A1 3/2005 Tandon et al.
2005/0230240 A1 10/2005 Dubrovsky et al.
2006/0037244 A1 2/2006 Clawson
2006/0068987 A1 3/2006 Bollepalli et al.
2006/0107789 A1 5/2006 Deegan et al.
2006/0226538 A1 10/2006 Kawata
2006/0239890 A1 10/2006 Chang et al.
2007/0140004 A1 6/2007 Marotta et al.
2007/0183959 A1 8/2007 Charlier et al.
2007/0270511 A1 11/2007 Melnichuk et al.
2008/0041829 A1 2/2008 Blutke et al.
2008/0121624 A1 5/2008 Belashchenko et al.
2008/0169183 A1 7/2008 Hertel et al.
2008/0182298 A1 7/2008 Day
2008/0226538 A1 9/2008 Rumpf et al.
2008/0279749 A1 11/2008 Probst et al.
2008/0292533 A1 11/2008 Belmont et al.
2009/0014423 A1 1/2009 Li et al.
2009/0090282 A1 4/2009 Gold et al.
2009/0142250 A1 6/2009 Fabry et al.
2009/0155157 A1 6/2009 Stenger et al.
2009/0173252 A1 7/2009 Nakata et al.
2009/0208751 A1 8/2009 Green et al.
2009/0230098 A1 9/2009 Salsich et al.
2010/0249353 A1 9/2010 MacIntosh et al.
2011/0036014 A1 2/2011 Tsangaris et al.
2011/0071692 A1 3/2011 D'Amato et al.
2011/0076608 A1 3/2011 Bergemann et al.
2011/0155703 A1 6/2011 Winn
2011/0180513 A1 7/2011 Luhrs et al.
2011/0239542 A1 10/2011 Liu et al.
2012/0018402 A1 1/2012 Carducci et al.
2012/0025693 A1 2/2012 Wang et al.
2012/0201266 A1 8/2012 Boulos et al.
2012/0232173 A1 9/2012 Juranitch et al.
2012/0292794 A1 11/2012 Prabhu
2013/0039841 A1 2/2013 Nester et al.
2013/0062195 A1 3/2013 Samaranayake et al.
2013/0062196 A1 3/2013 Sin
2013/0092525 A1 4/2013 Li et al.
2013/0194840 A1 8/2013 Huselstein et al.
2013/0292363 A1 11/2013 Hwang et al.
2013/0323614 A1 12/2013 Chapman et al.
2013/0340651 A1 12/2013 Wampler et al.
2014/0057166 A1 2/2014 Yokoyama et al.
2014/0131324 A1 5/2014 Shipulski et al.
2014/0190179 A1 7/2014 Barker et al.
2014/0224706 A1 8/2014 Do et al.
2014/0227165 A1 8/2014 Hung et al.
2014/0248442 A1 9/2014 Luizi et al.
2014/0290532 A1 10/2014 Rodriguez et al.
2014/0294716 A1 10/2014 Susekov et al.
2014/0339478 A1 11/2014 Probst et al.
2014/0357092 A1 12/2014 Singh
2014/0373752 A2 12/2014 Hassinen et al.
2015/0044516 A1 2/2015 Kyrlidis et al.
2015/0056516 A1 2/2015 Hellring et al.
2015/0064099 A1 3/2015 Nester et al.
2015/0180346 A1 6/2015 Yuzurihara et al.
2015/0210856 A1 7/2015 Johnson et al.
2015/0210857 A1 7/2015 Johnson et al.
2015/0210858 A1 7/2015 Hoermann et al.
2015/0211378 A1 7/2015 Johnson et al.
2015/0217940 A1 8/2015 Si et al.
2015/0218383 A1 8/2015 Johnson et al.
2015/0223314 A1 8/2015 Hoermann et al.
2016/0030856 A1 2/2016 Kaplan et al.
2016/0210856 A1 7/2016 Assenbaum et al.
2016/0243518 A1 8/2016 Spitzl
2016/0293959 A1 10/2016 Blizanac et al.
2017/0034898 A1 2/2017 Moss et al.
2017/0037253 A1 2/2017 Hardman et al.
2017/0058128 A1 3/2017 Johnson et al.
2017/0066923 A1 3/2017 Hardman et al.
2017/0073522 A1 3/2017 Hardman et al.
2017/0349758 A1 12/2017 Johnson
2018/0015438 A1 1/2018 Taylor et al.
2018/0016441 A1 1/2018 Taylor et al.
2018/0022925 A1 1/2018 Hardman et al.

FOREIGN PATENT DOCUMENTS

CA 964 405 A1 3/1975
CA 2 353 752 A1 1/2003
CA 2 621 749 A1 8/2009
CN 1644650 A 7/2005
CN 101092691 A 12/2007
CN 102108216 A 6/2011
CN 102993788 A 3/2013
CN 103160149 A 6/2013
CN 203269847 U 11/2013
DE 211457 A3 7/1984
DE 198 07 224 A1 8/1999
EP 0 325 689 A1 8/1989
EP 0 616 600 A1 9/1994
EP 0 635 044 B1 2/1996
EP 0 635 043 B1 6/1996
EP 0 861 300 A1 9/1998
EP 1 188 801 A1 3/2002
EP 1 088 854 A2 4/2010
FR 2 891 434 A1 3/2007
FR 2 937 029 A1 4/2010
GB 395 893 A 7/1933
GB 987498 3/1965
GB 1 400 266 A 7/1975
GB 1 492 346 A 11/1977
JP 4-228270 A 8/1992
JP 6-322615 A 11/1994
JP 9-316645 A 12/1997
JP 11-123562 A 5/1999
JP 2004-300334 A 10/2004
JP 2005-235709 A 9/2005
JP 2005-243410 A 9/2005
KR 10-2008-105344 A 12/2008
KR 2014-0075261 A 6/2014
RU 2425795 C2 8/2011
RU 2488984 C2 7/2013
WO 93/12031 6/1993
WO 93/18094 A1 9/1993
WO 93/20153 A1 10/1993
WO WO-9320152 A1 10/1993
WO 93/23331 A1 11/1993
WO 1994/008747 A1 4/1994
WO 97/03133 1/1997
WO 98/13428 A1 4/1998
WO WO-0018682 A1 4/2000
WO 03/014018 A1 2/2003
WO 2012/015313 A1 2/2012
WO 2012/067546 A2 5/2012
WO 2012/094743 A1 7/2012
WO 2012/149170 A1 11/2012
WO 2013/134093 A1 9/2013
WO 2013/184074 A1 12/2013
WO 2013/185219 A1 12/2013
WO 2014/000108 A1 1/2014
WO 2014/012169 A1 1/2014
WO 2015/049008 A1 4/2015
WO 2015/093947 A1 6/2015

(56) References Cited

FOREIGN PATENT DOCUMENTS

| | | |
|---|---|---|
| WO | 2015/116797 A1 | 8/2015 |
| WO | 2015/116798 A1 | 8/2015 |
| WO | 2015/116800 A1 | 8/2015 |
| WO | 2015/116807 A1 | 8/2015 |
| WO | 2015/116811 A1 | 8/2015 |
| WO | 2015/116943 A2 | 8/2015 |
| WO | 2016/012367 A1 | 1/2016 |
| WO | 2016/014641 A1 | 8/2016 |
| WO | 2016/126598 A1 | 8/2016 |
| WO | 2016/126599 A1 | 8/2016 |
| WO | 2016/126600 A1 | 8/2016 |
| WO | 2017/019683 A1 | 2/2017 |
| WO | 2017/027385 A1 | 2/2017 |
| WO | 2017/034980 A1 | 3/2017 |
| WO | 2017/044594 A1 | 3/2017 |
| WO | 2017/048621 A1 | 3/2017 |
| WO | 2017/190015 A1 | 11/2017 |
| WO | 2017/190045 A1 | 11/2017 |
| WO | 2018/165483 A1 | 9/2018 |
| WO | 2018/195460 A1 | 10/2018 |

OTHER PUBLICATIONS

Breeze, "Raising steam plant efficiency—Pushing the steam cycle boundaries." PEI Magazine 20.4 (2012).
Chiesa et al., "Using Hydrogen as Gas Turbine Fuel". ASME. J. Eng. Gas Turbines Power (2005),127(1):73-80. doi:10.1115/1.1787513.
Donnet et al. "Observation of Plasma-Treated Carbon Black Surfaces by Scanning Tunnelling Microscopy," Carbon (1994) 32(2):199-206.
Larouche et al. "Nitrogen Functionalization of Carbon Black in a Thermo-Convective Plasma Reactor," Plasma Chem Plasma Process (2011) 31:635-647.
Polman et al., "Reduction of CO2 emissions by adding hydrogen to natural gas." IEA Green House Gas R&D programme (2003).
Reynolds, "Electrode Resistance: How Important is Surface Area" Oct. 10, 2016. p. 3 para[0001]; Figure 3; Retrieved from http://electrofishing.net/2016/10/10/electrode-resistance-how-important-is-surface-area/ on May 8, 2018.
Tsujikawa, Y., and T. Sawada. "Analysis of a gas turbine and steam turbine combined cycle with liquefied hydrogen as fuel." International Journal of Hydrogen Energy 7.6 (1982): 499-505.
U.S. Environmental Protection Agency, "Guide to Industrial Assessments for Pollution Prevention and Energy Efficiency," EPA 625/R-99/003, 1999.
Verfondern, K., "Nuclear Energy for Hydrogen Production", Schriften des Forschungzentrum Julich, vol. 58, 2007.
Wikipedia "Heating Element" Oct. 14, 2016. p. 1 para[0001]. Retrieved from https://en.wikipedia.org/w/index.php?title=Heating_element&oldid=744277540 on May 9, 2018.
Wikipedia "Joule Heating" Jan. 15, 2017. p. 1 para[0002]. Retrieved from https://en.wikipedia.org/w/index.php?title=Joule_heating&oldid=760136650 on May 9, 2018.
Corrected Notice of Allowance dated Feb. 9, 2018 in U.S. Appl. No. 14/601,761.
Extended European Search Report from EP Application No. 15743214.7 dated Jan. 16, 2018.
Extended European Search Report from EP Application No. 16747055.8 dated Jun. 27, 2018.
Extended European Search Report from EP Application No. 16747056.6 dated Jun. 27, 2018.
Extended European Search Report from EP Application No. 16747057.4 dated Oct. 9, 2018.
Extended European Search Report from EP Application No. 16835697.0 dated Nov. 28, 2018.
Final Office Action dated Oct. 13, 2017 in U.S. Appl. No. 14/591,476.
Final Office Action dated Oct. 13, 2017 in U.S. Appl. No. 14/591,541.
Final Office Action dated Sep. 19, 2017 in U.S. Appl. No. 15/221,088.
Final Office Action from U.S. Appl. No. 15/259,884, dated Oct. 11, 2018.
Invitation to Pay Additional Fees dated Jun. 18, 2018 in PCT/US2018/028619.
Invitation to Pay Additional Fees in PCT/US2018/048378 dated Oct. 26, 2018.
Invitation to Pay Additional Fees in PCT/US2018/048381 dated Oct. 9, 2018.
IPRP from PCT/US2015/013482, dated Aug. 2, 2016.
IPRP from PCT/US2017/030139 dated Oct. 30, 2018.
IPRP from PCT/US2017/030179 dated Oct. 30, 2018.
ISR and Written Opinion for PCT/US2018/048374 dated Nov. 26, 2018.
ISR and Written Opinion for PCT/US2018/048378 dated Dec. 20, 2018.
ISR and Written Opinion for PCT/US2018/048381 dated Dec. 14, 2018.
ISR and Written Opinion from PCT/US2018/021627, dated May 31, 2018.
ISR and Written Opinion from PCT/US2018/028619, dated Aug. 9, 2018.
Non-Final Office Action dated Apr. 20, 2018 in U.S. Appl. No. 15/221,088.
Non-Final Office Action dated Jan. 16, 2018 in U.S. Appl. No. 14/591,528.
Non-Final Office Action dated Jan. 9, 2018 in U.S. Appl. No. 15/259,884.
Non-Final Office Action dated Jul. 6, 2018 in U.S. Appl. No. 15/241,771.
Non-Final Office Action dated Jun. 1, 2018 in U.S. Appl. No. 15/262,539.
Non-Final Office Action dated Jun. 7, 2018 in U.S. Appl. No. 14/591,476.
Non-Final Office Action dated Jun. 7, 2018 in U.S. Appl. No. 15/410,283.
Non-Final Office Action from U.S. Appl. No. 15/548,352 dated Oct. 10, 2018.
Notice of Allowance dated Jan. 18, 2018 in U.S. Appl. No. 14/601,761.
Notice of Allowance dated Jun. 19, 2018 in U.S. Appl. No. 14/601,761.
Notice of Allowance dated Jun. 7, 2018 in U.S. Appl. No. 14/591,541.
Search report from RU Application No. 2016135213 dated Feb. 12, 2018.
Translation of Official Notification of RU Application No. 2016135213 dated Feb. 12, 2018.
Invitation to Pay Additional Fees in PCT/US2018/057401 dated Dec. 19, 2018.
Final Office Action for U.S. Appl. No. 15/262,539 dated Jan. 4, 2019.
Gago et al., "Growth mechanisms and structure of fullerene-like carbon-based thin films: superelastic materials for tribological applications," Trends in Fullerene Research, Published by Nova Science Publishers, Inc. (2007), pp. 1-46.
ISR and Written Opinion from PCT/US2015/013482, dated Jun. 17, 2015.
ISR and Written Opinion from PCT/US2015/013505, dated May 11, 2015.
ISR and Written Opinion from PCT/US2015/013794, dated Jun. 19, 2015.
Donnet, Basal and Wang, "Carbon Black", New York: Marcel Dekker, 1993 pp. 46, 47 and 54.
Boehm, HP, "Some Aspects of Surface Chemistry of Carbon Blacks and Other Carbons", Carbon 1994, p. 759.
"The Science and Technology of Rubber" (Mark, Erman, and Roland, Fourth Edition, Academic Press, 2013).
"Carbon Black Elastomer Interaction" Rubber Chemistry and Technology, 1991, pp. 19-39.
"The Impact of a Fullerene-Like Concept in Carbon Black Science", Carbon, 2002, pp. 157-162.
ISR and Written Opinion from PCT/US2015/013510, dated Apr. 22, 2015.
ISR and Written Opinion from PCT/US2016/015939, dated Jun. 3, 2016.

(56) References Cited

OTHER PUBLICATIONS

ISR and Written Opinion from PCT/US2016/015941, dated Apr. 22, 2016.
ISR and Written Opinion from PCT/US2016/015942, dated Apr. 11, 2016.
ISR and Written Opinion from PCT/US2016/044039, dated Oct. 6, 2016.
ISR and Written Opinion from PCT/US2016/045793, dated Oct. 18, 2016.
ISR and Written Opinion from PCT/US2016/050728, dated Nov. 18, 2016.
ISR and Written Opinion from PCT/US2016/051261, dated Nov. 18, 2016.
ISR and Written Opinion from PCT/US2015/013484, dated Apr. 22, 2015.
Non-Final Office Action dated Mar. 16, 2016 in U.S. Appl. No. 14/591,476.
Final Office Action dated Jul. 11, 2016 in in U.S. Appl. No. 14/591,476.
Non-Final Office Action dated Mar. 16, 2016 in U.S. Appl. No. 14/591,541.
Final Office Action dated Jul. 14, 2016 in U.S. Appl. No. 14/591,541.
Non-Final Office Action dated Apr. 13, 2016 in U.S. Appl. No. 14/601,761.
Final Office Action dated Oct. 19, 2016 in U.S. Appl. No. 14/601,761.
Non-Final Office Action dated Apr. 13, 2016 in U.S. Appl. No. 14/601,793.
Final Office Action dated Aug. 3, 2016 in U.S. Appl. No. 14/601,793.
Notice of Allowance dated Oct. 7, 2016 in U.S. Appl. No. 14/601,793.
Non-Final Office Action dated Dec. 23, 2016 in U.S. Appl. No. 15/221,088.
AP 42, Fifth Edition, vol. I, Chapter 6: Organic Chemical Process Industry, Section 6.1: Carbon Black.
Fulcheri, et al. "Plasma processing: a step towards the production of new grades of carbon black." Carbon 40.2 (2002): 169-176.
Grivei, et al. A clean process for carbon nanoparticles and hydrogen production from plasma hydrocarbon cracking. Publishable Report, European Commission JOULE III Programme, Project No. JOE3-CT97-0057, circa 2000.
Fabry, et al. "Carbon black processing by thermal plasma. Analysis of the particle formation mechanism." Chemical Engineering Science 56.6 (2001): 2123-2132.
Pristavita, et al. "Carbon nanoparticle production by inductively coupled thermal plasmas: controlling the thermal history of particle nucleation." Plasma Chemistry and Plasma Processing 31.6 (2011): 851-866.
Cho, et al. "Conversion of natural gas to hydrogen and carbon black by plasma and application of plasma black." Symposia—American Chemical Society, Div. Fuel Chem. vol. 49. 2004.
Pristavita, et al. "Carbon blacks produced by thermal plasma: the influence of the reactor geometry on the product morphology." Plasma. Chemistry and Plasma. Processing 30.2 (2010): 267-279.
Pristavita, et al. "Volatile Compounds Present in Carbon Blacks Produced by Thermal Plasmas." Plasma Chemistry and Plasma. Processing 31.6 (2011): 839-850.
Garberg, et al. "A transmission electron microscope and electron diffraction study of carbon nanodisks." Carbon 46.12 (2008): 1535-1543.
Knaapila, et al. "Directed assembly of carbon nanocones into wires with an epoxy coating in thin films by a combination of electric field alignment and subsequent pyrolysis." Carbon 49.10 (2011): 3171-3178.
Krishnan, et al. "Graphitic cones and the nucleation of curved carbon surfaces." Nature 388.6641 (1997): 451-454.
Hoyer, et al. "Microelectromechanical strain and pressure sensors based on electric field aligned carbon cone and carbon black particles in a silicone elastomer matrix." Journal of Applied Physics 112.9 (2012): 094324.
Naess, Stine Nalum, et al. "Carbon nanocones: wall structure and morphology." Science and Technology of advanced materials (2016), 7 pages.
Fulcheri, et al. "From methane to hydrogen, carbon black and water." International journal of hydrogen energy 20.3 (1995): 197-202.
ISR and Written Opinion from PCT/US2016/047769, dated Dec. 30, 2016.
D.L. Sun, F. Wang, R.Y. Hong, C.R. Xie, Preparation of carbon black via arc discharge plasma enhanced by thermal pyrolysis, Diamond & Related Materials (2015), doi: 10.1016/j.diamond.2015.11.004, 47 pages.
Non-Final Office Action dated Feb. 22, 2017 in U.S. Appl. No. 14/591,541.
Non-Final Office Action dated May 2, 2017 in U.S. Appl. No. 14/610,299.
Ex Parte Quayke Action dated May 19, 2017 in U.S. Appl. No. 14/601,761.
Extended European Search Report from EP Application No. 15 742 910.1 dated Jul. 18, 2017.
Search report in counterpart European Application No. 15 74 3214 dated Sep. 12, 2017.
ISR and Written Opinion from PCT/US2017/030139, dated Jul. 19, 2017.
ISR and Written Opinion from PCT/US2017/030179, dated Jul. 27, 2017.
A.I. Media et al., "Tinting Strength of Carbon Black," Journal of Colloid and Interface Science, vol. 40, No. 2, Aug. 1972.
Reese, J. (2017). Resurgence in American manufacturing will be led by the rubber and tire industry. Rubber World. 255. 18-21 and 23.
Non-Final Office Action dated Feb. 27, 2017 in U.S. Appl. No. 14/591,476.
EP17790549.4 Extended European Search Report dated Nov. 26, 2019.
EP17790570.0 Extended European Search Report dated Nov. 8, 2019.
U.S. Appl. No. 15/548,346 Office Action dated Oct. 22, 2019.
U.S. Appl. No. 14/591,528 Office Action dated Oct. 28, 2019.
U.S. Appl. No. 15/229,608 Office Action dated Oct. 25, 2019.

* cited by examiner

REGENERATIVE COOLING METHOD AND APPARATUS

CROSS-REFERENCE TO RELATED APPLICATIONS

The present application claims the benefit of and priority to provisional patent application Ser. No. 62/111,341 filed Feb. 3, 2015, the disclosure of which is herein incorporated by reference.

TECHNICAL FIELD

The field of art to which this invention generally pertains is methods and apparatus for making use of electrical energy to effect chemical changes.

BACKGROUND

There are many processes that can be used and have been used over the years to produce carbon black. The energy sources used to produce such carbon blacks over the years have, in large part, been closely connected to the raw materials used to convert hydrocarbon containing materials into carbon black. Residual refinery oils and natural gas have long been a resource for the production of carbon black. Energy sources have evolved over time in chemical processes such as carbon black production from simple flame, to oil furnace, to plasma, to name a few. As in all manufacturing, there is a constant search for more efficient and effective ways to produce such products. Varying flow rates and other conditions of energy sources, varying flow rates and other conditions of raw materials, increasing speed of production, increasing yields, reducing manufacturing equipment wear characteristics, etc. have all been, and continue to be, part of this search over the years.

The systems described herein meet the challenges described above, and additionally attain more efficient and effective manufacturing process.

BRIEF SUMMARY

A method of cooling a liner in a plasma chamber is described including, contacting the liner with or passing through the liner, at least one recycle gas to be used to create the plasma in the plasma chamber, to cool the plasma chamber liner and pre-heat the recycle gas, and returning the pre-heated recycle gas to the plasma chamber to create the plasma.

Additional embodiments include: the method described above where the liner is graphite; the method described above where the recycle gas passes through at least one cooling channel present in the liner; the method described above where at least one of the cooling channels are covered with at least one removable liner/channel cover; the method described above where the cover is removed to remove any carbon deposits in the channels; the method described above where the carbon deposits are formed from the presence of hydrocarbons in the recycle gas; the method described above where at least one channel is formed in a spiral cooling channel pattern; the method described above where at least one channel is formed in a substantially straight cooling channel pattern; the method described above including more than one channel; the method described above including a plenum to aid in the production of an even distribution of cooling gas in the channels; the method described above including adding an oxidizing gas to the recycle gas to reduce or eliminate the presence of hydrocarbons in the recycle gas and/or reduce the formation of carbon deposits; the method described above where the oxidizing gas is steam and/or carbon dioxide; the method described above including passing an oxidizing gas through at least one of the channels to remove any carbon deposits in the channel; the method described above where the oxidizing gas is steam and/or carbon dioxide; the method described above where the carbon deposits are formed from the presence of hydrocarbons in the recycle gas; the method described above where the liner contains a plurality of perforations providing an ingress for the pre-heated recycle gas; the method described above where the perforations comprise one to six sets of co-planar perforations along the plasma chamber; the method described above where the plasma chamber is cylindrical and the perforations are along the curved sections of the plasma chamber cylinder; the method described above where the perforations allow aspirational cooling; the method described above where the plasma chamber contains a plasma torch annulus, and the gas is recycled to inside and/or outside the torch annulus; the method described above where the plasma is generated using an AC power source; the method described above where the plasma is generated using a DC power source; the method described above including injecting a hydrocarbon feedstock into the chamber such that over 30% of the energy input into the system measured in Joules is transferred to the hydrocarbon feedstock within the first 1 second of injection; the method described above where the hydrocarbon feedstock is natural gas; the method described above where the hydrocarbon feedstock is injected downstream of the plasma creation; and the method described above where the hydrocarbon feedstock is injected upstream of the plasma creation.

These, and additional embodiments, will be apparent from the following descriptions.

BRIEF DESCRIPTION OF THE DRAWINGS

The FIGS. 1, 2 and 3 show schematic representations of typical methods and apparatus described herein.

DETAILED DESCRIPTION

Figure 1:
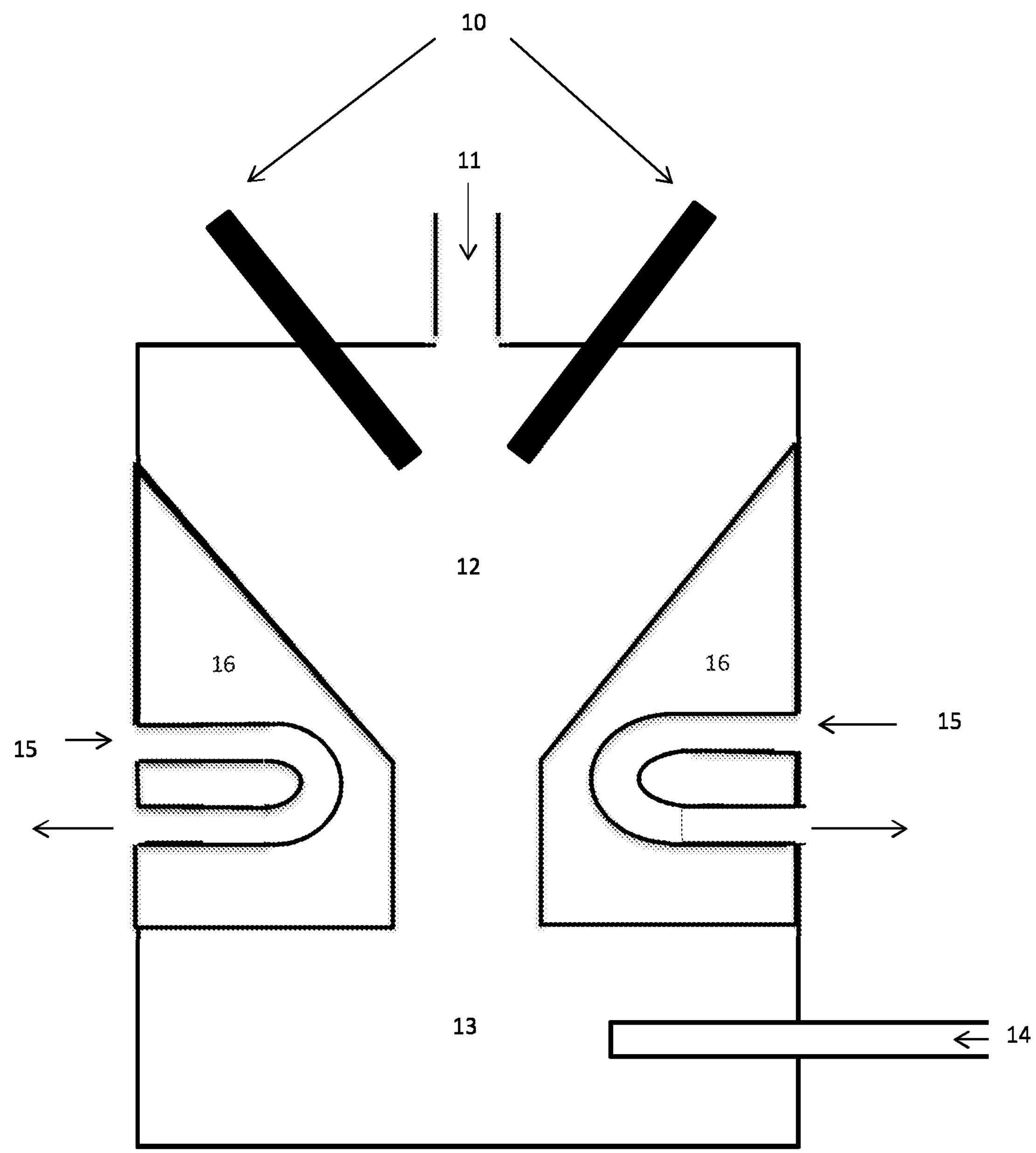

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

Heat transfer or cooling mechanisms in the past have typically been external to the plasma chamber. For the furnace process, the burner does not need excessive cooling because of the inherent lower temperatures in the furnace process compared to a plasma process. An example of what could be considered as inefficient cooling/pre-heat of recycle gas can be found in published patent application US2014/190,179. The heat exchanger is located external to the plasma chamber resulting in inefficient cool down or lack of cool down in plasma chamber and an insufficiently heated recycle/plasma gas.

As described herein, the use of regenerative cooling enables higher plasma temperatures to be used in chemical processes without generating excessive plasma chamber liner temperatures. Previous uses of plasmas to make carbon black, for example, either limited the plasma temperatures which could be used, or used water cooling to limit the loss of, for example, graphite when used in the process, e.g. as a liner, to sublimation. As described herein, recycle plasma gas is used to cool the lining, e.g. graphite, with the gas ultimately to be used in the plasma chamber.

Energy absorbed in cooling the liner is returned to the process as preheated gas used in the plasma chamber, which can represent significant energy cost savings to the overall process. As mentioned previously, in published patent application US2014/190,179, the heat transfer mechanism is external to the plasma chamber. The system described herein provides for a simultaneously cooled plasma chamber liner and heated recycle/plasma gas by engineering and incorporating the cooling mechanism into the inner skin of the liner itself. The gas cools the liner by heat-transfer contact with the liner along various places in or on the liner. In one embodiment, the gas flows in channels cut into the liner. In another embodiment, the cut channels are covered with a removable cover or seal. This use of a removable liner cover or seal enables easy replacement of the liner should it get too hot, for example, and also allows easy access to the channels for cleaning or whatever other maintenance may be needed. Instead of using recycled plasma gas as described herein and lowering temperatures inside the chamber, an alternative would be to run the torch at higher power density (increased power with the same gas flow). With the recycled plasma gas system as described herein turned on the result would be chamber temperatures similar to the lower power density case without the recycled plasma gas system being used as described herein. The advantage would be the gas leaves the chamber at a higher temperature, giving it more usable enthalpy per unit of power consumed, leading to a more thermally efficient process.

Figure 3:
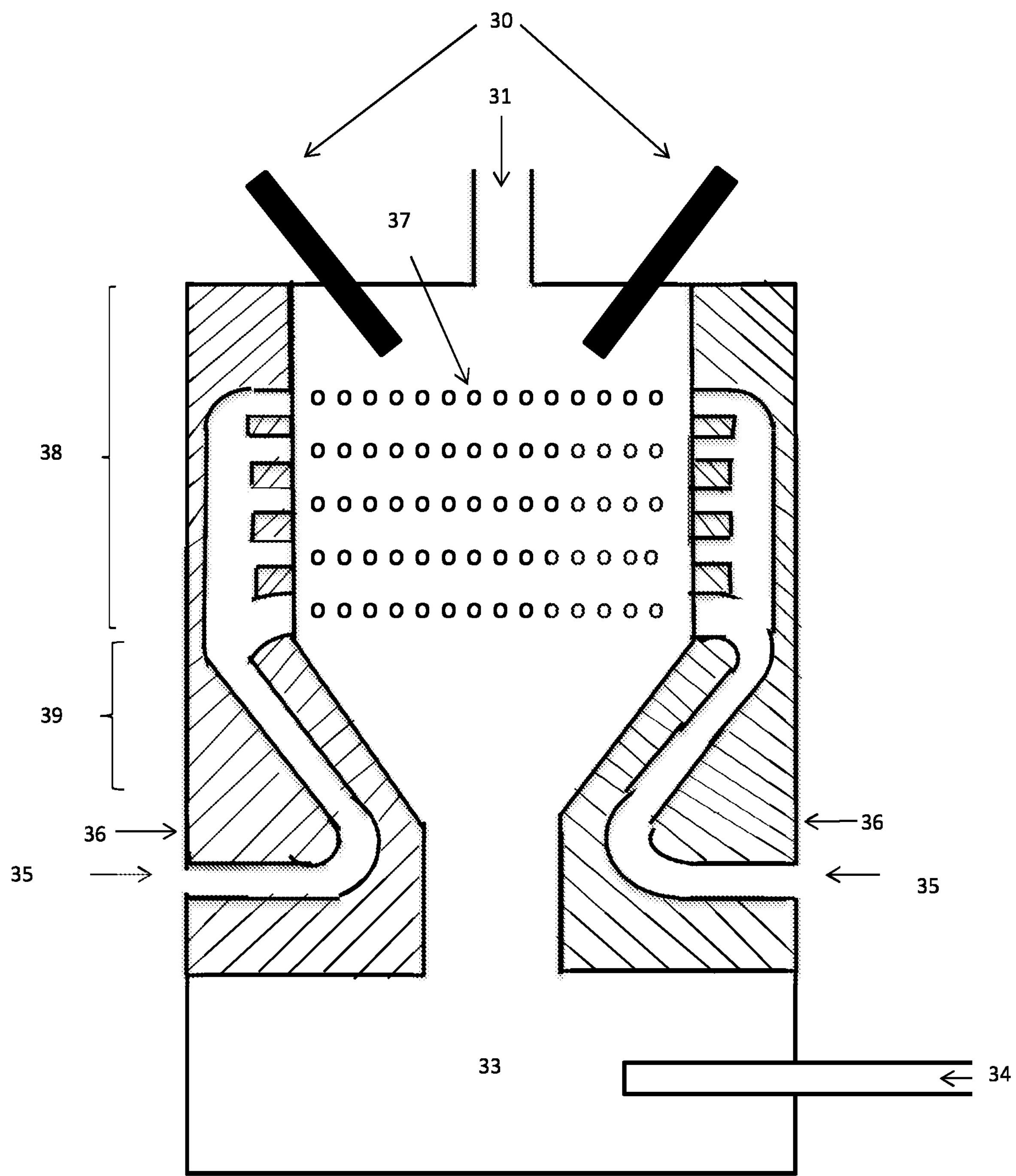

While the perforations are shown in FIG. 3 as regularly spaced circular holes, it should be noted that any openings that provide for the injection of the pre-heated recycle gas (such as hydrogen) into the plasma chamber can be used, e.g., random holes or perforations, zig-zag patterns, slit shaped perforations, etc. Similarly, the plasma chamber can be of any shape, such as cylindrical, and the perforations therefore would be along the curved sections of the cylindrical plasma chamber.

Should the cooling recycle gas contain trace amounts of hydrocarbons or other contaminants which lead to the formation of carbon or other deposits in the cooling channels, such deposits can be easily removed so as not to limit or otherwise interfere with the cooling in the liner which would be otherwise achieved. Steam, carbon dioxide and/or other oxidizing gases can also be added to the recycle gas to help reduce the amount of hydrocarbons or other contaminants which may be present in the recycle cooling gas, again, so as to reduce or eliminate the deposition of carbon or other contaminants in the cooling channels. In addition, if any deposited carbon or other contaminants are deposited in the channels, feeding steam, carbon dioxide and/or other oxidizing gas into the channels can also assist in eliminating any such deposits from the channels.

It is advantageous to obtain as uniform a cooling as possible in the liner, e.g., to avoid formation of "hot spots" in or on the liner. Accordingly, it is beneficial to subject the liner to as uniform and continuous a contact with cooling gas as possible, either externally and/or internally One embodiment for achieving a more even distribution of cooling gas is the use of one or more spiral cooling channels in the liners, although one or more straight, curved, or otherwise non-spiral channels can be used as well, either in combination or instead of spiral channels. If multiple channels are used, the use of a plenum to help provide an even distribution of the cooling gases within the channels is also beneficial.

The size and spacing of the channels will of course depend on the temperatures being generated in the plasma and/or reaction chambers, and the amount of cooling desired. Typical temperatures in the plasma chamber range from about 2500° C. to about 6000° C. and about 1200° C. to about 3000° C. in the reaction chamber. The channels are typically machined in as grooves, e.g., using conventional graphite cutting techniques and equipment, and are typically square or rectangular in cross section, and can be any size to accommodate the amount of cooling desired, e.g., 15 to 30 millimeters (mm) across and 50 to 100 mm deep.

Typically, between about 2 and about 20 MegaWatts of power are employed to create the plasma. The energy as measured in Joules will first be employed to create the plasma, and then be subsequently absorbed into the walls of the reactor, transferred to the plasma gas that did not go through the annulus or the plasma zone, and either immediately absorbed by the hydrocarbon or transferred to the injected hydrocarbon from the walls or from the plasma gas. The energy is absorbed by the hydrocarbon in the first one second after injection in the amount of at least 20%, 30%, or 40% or greater as measured in Joules. This energy can be absorbed from the electrodes, the plasma gas, the wall of the reactors, etc.

A perforated liner to enable aspirational cooling of the liner can also be used. Not only could this allow cooling gases to pass through the liner more uniformly, but it could also accelerate passage of gases in the hottest areas to dissipate heat more quickly, again to assist in attaining more uniform cooling. The pores present in the liner could either be drilled into the liner, or their formation incorporated into the process of manufacturing of the (porous) graphite used to form the liner.

Depending on the shape of the plasma assembly, the cooling gases can also be used in the torch annulus and/or outside of the torch annulus. Gas heated in the channels can be added to the plasma chamber or to the plasma gas which then flows through the annulus between the electrodes, i.e., since not all torches have an annulus, the recycle gas can be added to the plasma or mixed into the plasma after the arc. The torch annulus is defined as the space between two nested, concentric hollow cylinders that are used as the positive and negative electrodes of the torch.

As described herein, the cooling gases are used to cool the liner with the gas used in the plasma chamber, and in doing so preheat the gas used in the chamber, thereby reducing the amount of energy required to heat the plasma chamber gases to achieve a given temperature.

Referring to the Figures, which are schematic representations of systems described herein, conventional plasma gas (11, 21 and 31) such as oxygen, nitrogen, argon, helium, air, hydrogen, etc. (used alone or in mixtures of two or more) is injected into a plasma forming zone (12 and 22, and below the perforations 37 in FIG. 3) containing conventional plasma forming electrodes (10, 20 and 30) (which are typically made of copper, tungsten, graphite, molybdenum, silver etc.). The thus-formed plasma then enters into the reaction zone (13, 23 and 33) where it reacts/interacts with a carbon containing feedstock (14, 24 and 34) to generate a carbon black product. The liners (16, 26 and 36) can be any conventionally used material which can withstand the plasma forming temperatures, with graphite being preferred. Materials that can only withstand plasma forming temperatures with cooling may also be used. As shown, the recycle cooling gas flows through the cooling channels (15, 25 and 35), cooling the liner (16, 26 and 36) and heating the gas. The heated gas then flows into the plasma arc (as all or part of stream 11) as demonstrated in FIG. 1 and/or mixes into the plasma gas (formed from stream 21) with the mixing occurring in the plasma zone (22) as demonstrated in FIG. 2, or through the perforations (37) shown in FIG. 3. The mixture then flows into the reaction zone (13, 23 and 33) to contact the feedstock gas (14, 24 and 34).

Adding the heated cooling gas into the plasma gas stream (11) could potentially cause problems for the arc formed between the electrodes (10), so in some cases it may not be desirable. In these instances, all of or a portion of the cooling gas can instead get added to the plasma zone (22 and through perforations 37), preferably along the inside of the liner so that the gas provides additional protection for the liner from the hot plasma gas. The mixture then flows into the reaction zone (23 and 33) to contact the feedstock gas (24 and 34). It should also be noted, that that the direction of flow shown for the cooling gases (15 in FIG. 1) can also be in a direction reverse of that shown. The desired direction of flow will be dependent on the radiation flux on the liner, which is in turn dependent on the actual geometry of the liner. Thus flow can be counter current to plasma gas flow, co-current and/or cross-flow. The pre-heated gas can be injected through a co-planar set of perforations or multiple sets of co-planar perforations. The upper section (38) of the perforated section of FIG. 3 can be cylindrical in shape, with the lower section (39) being a converging cone. Although not shown in FIG. 3, it should also be noted that the perforations can extend above the space in the plasma chamber occupied by the electrodes as well.

The Figures demonstrate liners with curved channels contained therein. However, it should be understood that the cooling of the liners can take place by simply passing the cooling recycle plasma gas along one or more surfaces of the liners (depending on liner design), or through the liner by virtue of the presence of one or more straight, curved, spiral or other shaped channels. Since there are numerous advantages associated with uniformity of cooling by and/or within the liner, if multiple channels are present in the liner, a plenum can be used to assist in leveling the flow into the respective channels to help produce more even heat distribution within the liner. The liners can also contain pores, or be porous, such that the cooling can take place as aspirational cooling. The size and shape of the liners, the pores and the cooling surfaces or channels will depend on the size and shapes of the plasma forming zone and reaction zone, the temperatures desired in each zone, the amount and rate of cooling desired, the specific plasma gas being used, etc. For example, the generation and use of plasma at temperatures in excess of 1000° C. are not uncommon, which is one reason temperature control can be important to the process.

Figure 2:
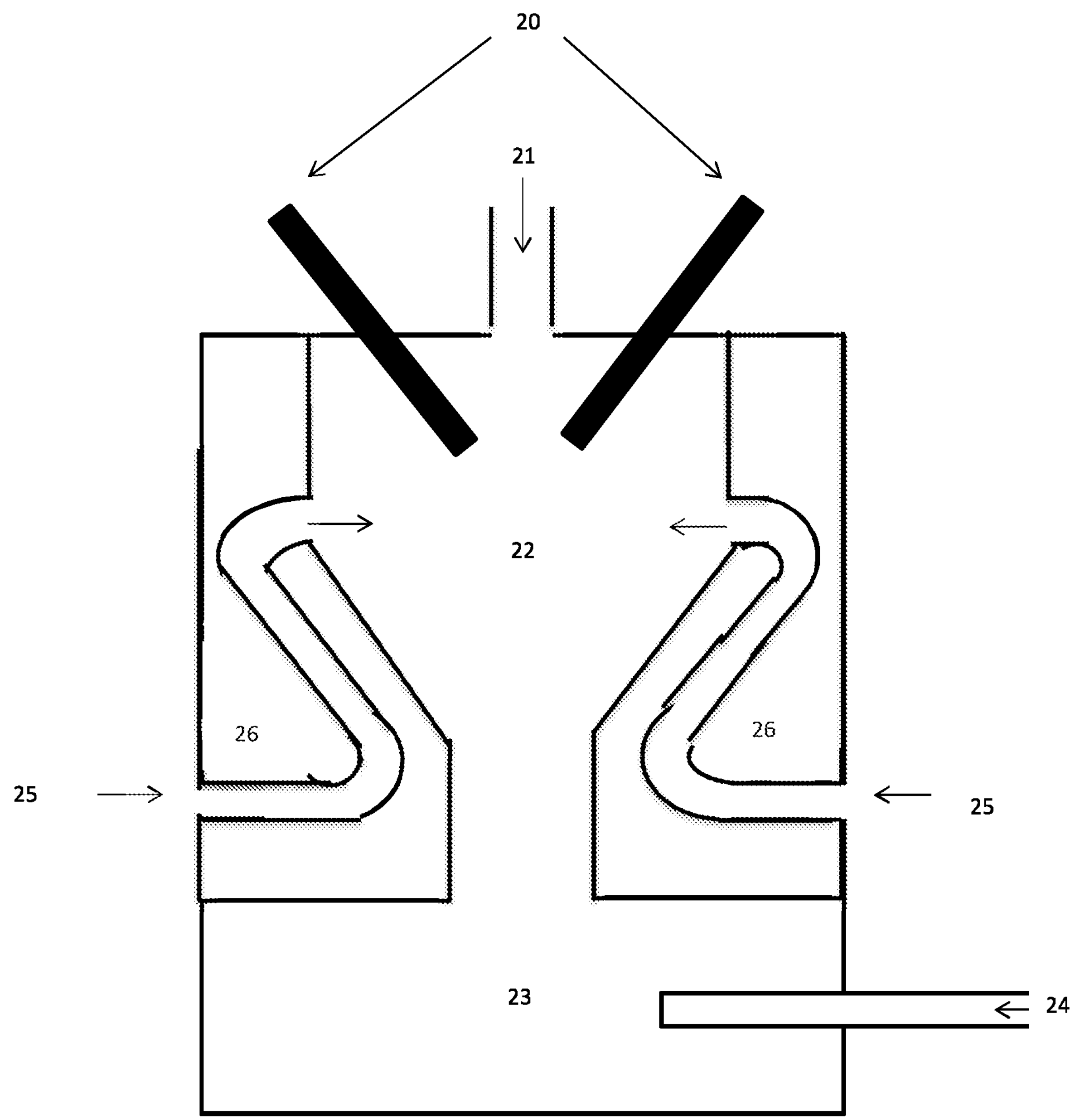

The Figures show a narrowing plasma chamber that then expands to a larger area downstream of plasma generation. An alternative configuration can entail a plasma chamber that does not narrow, but can or cannot expand downstream of plasma generation. The regenerative cooling would still take place in the general vicinity of the plasma generation (plasma chamber). Additionally, the hydrocarbon injection can occur either upstream or downstream of the plasma generation and can be centrally injected rather than the side injection that is depicted in FIGS. 1, 2, and 3.

Acceptable hydrocarbon feedstock includes any chemical with formula $C_nH_x$ or $C_nH_xO_y$ where n is an integer, and x is between 1 and 2n+2, and y is between 0 and n. For example simple hydrocarbons such as: methane, ethane, propane, butane, etc. can be used, as well as aromatic feedstock such as benzene, toluene, methyl naphthalene, pyrolysis fuel oil, coal tar, coal, heavy oil, oil, bio-oil, bio-diesel, other biologically derived hydrocarbons, or the like. Also, unsaturated hydrodcarbon feedstocks can also be used, such as: ethylene, acetylene, butadiene, styrene and the like. Oxygenated hydrocarbons such as; ethanol, methanol, propanol, phenol, ether, and similar are also acceptable feedstocks. These examples are provided as non-limiting examples of acceptable hydrocarbon feedstocks which can further be combined and/or mixed with other acceptable components for manufacture. Hydrocarbon feedstock referred to herein, means that the majority of the feedstock is hydrocarbon in nature. A preferred hydrocarbon feedstock for this process is natural gas.

The recycle plasma gas is flowed through the channels in the liner which in addition to reducing the temperatures in the plasma and/or reaction chambers, raises the temperature of the cooling gas as well. After being heated, the recycle plasma gas is then used as is or mixed with the plasma gas being injected into the plasma zone. As can be appreciated, this pre-heating of the plasma gas can provide significant energy costs savings to the process.

In one embodiment, the channels are open and accessible, but covered or sealed during use. This accessibility facilitates such things as repair and replacement of the liners, and/or cleaning of the channels. For example, the plasma gas can contain hydrocarbons or other contaminants. At the high temperatures experienced in typical plasma processes, carbon or other deposits can end up on the liner or in the channels or pores. A removable cover or seal can facilitate the cleaning of such deposits. The covers are typically made of the same material as the liners, but can also be made of a porous material (e.g., carbon fibers, graphite foam, etc).

Even without the covers or seals described above, another way to reduce or eliminate such deposits from the channels, is to add an oxidizing gas to the plasma forming gas prior to entry into the cooling channel. Similarly, an oxidizing gas can be simply run through the channels for the same purpose. Exemplary oxidizing gases could be steam and/or carbon dioxide, for example.

In some cases, the plasma forming zone may contain a conventional plasma torch annulus, as shown schematically in FIG. 1, e.g., having a cathode (11), anode (12), plasma or carrier working gas (10) and plasma jet region (13). In such cases, the cooling recycle plasma gas may be flowed inside or outside the torch annulus, i.e., the plasma recycle gas can be added to the carrier working gas stream (10), or added to the plasma jet region (13).

In another set of cases, AC or DC power can be used to form the plasma. Examples of an AC plasma system can be found in U.S. Pat. No. 7,452,514, for example. The AC system can utilize a plurality of electrodes that has the advantage of more efficient energy consumption as well as reduced heat load at the electrode surface. Examples of a suitable DC plasma system can be found, for example, in U.S. Pat. No. 7,462,343, and the references therein.

Example 1

Hydrogen gas is run through a conventional plasma torch electrode assembly in a plasma forming zone. Graphite liners with cooling channels line the plasma forming zone. As can be seen in the Table below, the average temperature of the plasma chamber wall is 2640 K and the maximum temperature is 3210 K. Through the diversion of 10%, 20%, and 30% of the total recycle gas, which is greater than 90% $H_2$, the following examples B, C, and D show a significant decrease in plasma wall temperature. For diversion of 30% of the total recycle gas the average temperature at the plasma wall is reduced from 2640 K to 2450 K and the maximum temperature is reduced from 3210 K to 3040 K. Each of these examples is with a heat input through the plasma torch of 750 KW (kilo watts) and a plasma gas flow rate of 340 $Nm^3$/hr (normal cubic meter/hour) of hydrogen.

TABLE

| Example | Hydrogen Gas at % of total | Average Temperature (K) | Maximum Temperature (K) |
|---|---|---|---|
| A | 0 | 2640 | 3210 |
| B | 10 | 2490 | 3140 |
| C | 20 | 2470 | 3090 |
| D | 30 | 2450 | 3040 |

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of cooling a liner in a plasma chamber, comprising:

providing at least one recycle gas from the plasma chamber;

contacting the liner with or passing through the liner the at least one recycle gas to cool the liner and pre-heat the at least one recycle gas to generate a pre-heated recycle gas; and directing the pre-heated recycle gas to the plasma chamber to create a plasma.

2. The method of claim 1, wherein the liner is graphite.

3. The method of claim 1, wherein the at least one recycle gas passes through at least one cooling channel present in the liner.

4. The method of claim 3, wherein a cooling channel of the at least one cooling channel is covered with at least one removable liner cover or channel cover.

5. The method of claim 4, wherein the at least one removable liner cover or channel cover is removed to remove any carbon deposits in the cooling channel.

6. The method of claim 5, wherein the carbon deposits are formed from a presence of hydrocarbons in the at least one recycle gas.

7. The method of claim 3, wherein a cooling channel of the at least one cooling channel is formed in a spiral cooling channel pattern.

8. The method of claim 3, wherein a cooling channel of the at least one cooling channel is formed in a substantially straight cooling channel pattern.

9. The method of claim 3, including more than one cooling channel.

10. The method of claim 9, including a plenum to aid in the production of an even distribution of cooling gas in the more than one cooling channel.

11. The method of claim 3, including adding an oxidizing gas to the at least one recycle gas to reduce or eliminate a presence of hydrocarbons in the at least one recycle gas and/or reduce the formation of carbon deposits.

12. The method of claim 11, wherein the oxidizing gas is steam and/or carbon dioxide.

13. The method of claim 3, including passing an oxidizing gas through a cooling channel of the at least one cooling channel to remove any carbon deposits in the cooling channel.

14. The method of claim 13, wherein the oxidizing gas is steam and/or carbon dioxide.

15. The method of claim 13, wherein the carbon deposits are formed from a presence of hydrocarbons in the at least one recycle gas.

16. The method of claim 1, wherein the liner contains a plurality of perforations providing an ingress for the preheated recycle gas.

17. The method of claim 16, wherein the perforations comprise one to six sets of co-planar perforations along the plasma chamber.

18. The method of claim 16, wherein the plasma chamber is cylindrical, and wherein the perforations are along curved sections of the plasma chamber cylinder.

19. The method of claim 16, wherein the perforations allow aspirational cooling.

20. The method of claim 1, wherein the plasma chamber contains a plasma torch annulus, and wherein the at least one recycle gas is recycled to inside and/or outside of the plasma torch annulus.

21. The method of claim 1, wherein the plasma is generated using an AC power source.

22. The method of claim 1, wherein the plasma is generated using a DC power source.

23. The method of claim 1, including injecting a hydrocarbon feedstock into the plasma chamber such that over 30% of the energy input into the system measured in joules is transferred to the hydrocarbon feedstock within the first 1 second of injection.

24. The method of claim 23, the hydrocarbon feedstock is natural gas.

25. The method of claim 23, the hydrocarbon feedstock is injected downstream of the plasma creation.

26. The method of claim 23, wherein the hydrocarbon feedstock is injected upstream of the plasma creation.

* * * * *